US009938375B2

(12) United States Patent
Siebecke et al.

(10) Patent No.: US 9,938,375 B2
(45) Date of Patent: Apr. 10, 2018

(54) REACTOR WITH VERTICAL CONDENSATION TUBE AND METHOD FOR THE POLYMERISATION OF POLYAMIDES IN SUCH A REACTOR

(71) Applicant: UHDE INVENTA-FISCHER GMBH, Berlin (DE)

(72) Inventors: Ekkehard Siebecke, Berlin (DE); Johannes Katzer, Berlin (DE); Bernd Königsmann, Langewahl (DE)

(73) Assignee: UHDE INVENTA-FISCHER GMBH, Berlin (DE)

( * ) Notice: Subject to any disclaimer, the term of this patent is extended or adjusted under 35 U.S.C. 154(b) by 17 days.

(21) Appl. No.: 14/766,045

(22) PCT Filed: Jan. 20, 2014

(86) PCT No.: PCT/EP2014/051005
§ 371 (c)(1),
(2) Date: Aug. 5, 2015

(87) PCT Pub. No.: WO2014/122002
PCT Pub. Date: Aug. 14, 2014

(65) Prior Publication Data
US 2016/0032050 A1    Feb. 4, 2016

(30) Foreign Application Priority Data

Feb. 8, 2013  (EP) ..................... 13154509

(51) Int. Cl.
*C08G 69/16* (2006.01)
*B01J 19/00* (2006.01)
(Continued)

(52) U.S. Cl.
CPC ............ *C08G 69/16* (2013.01); *B01J 19/006* (2013.01); *B01J 19/0013* (2013.01);
(Continued)

(58) Field of Classification Search
None
See application file for complete search history.

(56) References Cited

U.S. PATENT DOCUMENTS 2,562,796 A   7/1951  Koch
3,232,715 A   2/1966  Indest
(Continued)

FOREIGN PATENT DOCUMENTS

CN    1126482 A    7/1996
CN    1284093 A    2/2001
(Continued)

OTHER PUBLICATIONS

"Kunststoff-Handbuch. Technische Thermoplaste. Polyamide", Hanser Verlag, Publisher, Munich, Germany, vol. 3/4, pp. 67-68 (1998).
(Continued)

*Primary Examiner* — Rachel Kahn
(74) *Attorney, Agent, or Firm* — Leydig, Voit & Mayer, Ltd.

(57) ABSTRACT

The invention relates to a reactor in the form of a VK tube (VK: simplified continuous), for the polymerisation of polyamides, the reactor being subdivided into an upper and lower reactor region, which are controllable independently of each other. Likewise, the invention relates to a method for the production of polyamides in which such a reactor is used.

17 Claims, 2 Drawing Sheets

(51) Int. Cl.
*B01J 19/24* (2006.01)
*C08G 69/14* (2006.01)
*B01J 19/18* (2006.01)

(52) U.S. Cl.
CPC ......... *B01J 19/1812* (2013.01); *B01J 19/245* (2013.01); *B01J 19/2415* (2013.01); *C08G 69/14* (2013.01); *B01J 2219/00081* (2013.01); *B01J 2219/00083* (2013.01); *B01J 2219/00094* (2013.01); *B01J 2219/00164* (2013.01); *B01J 2219/00168* (2013.01); *B01J 2219/00774* (2013.01); *B01J 2219/182* (2013.01); *B01J 2219/1943* (2013.01); *B01J 2219/24* (2013.01)

(56) References Cited

U.S. PATENT DOCUMENTS

| | | | |
|---|---|---|---|
| 3,451,976 | A | 6/1969 | Lucas |
| 3,565,866 | A | 2/1971 | Guenther et al. |
| 3,813,366 | A | 5/1974 | Wright et al. |
| 4,172,938 | A | 10/1979 | Mera et al. |
| 4,354,020 | A * | 10/1982 | Rotzoll ............... B01J 19/18 526/65 |
| 5,647,973 | A | 10/1997 | Pipper et al. |
| 6,258,926 | B1 | 7/2001 | Wiltzer et al. |
| 6,429,279 | B1 | 8/2002 | Hünger et al. |
| 6,548,626 | B1 | 4/2003 | Mohrschladt et al. |
| 6,852,829 | B2 | 2/2005 | Buijs |
| 2003/0109645 | A1 | 6/2003 | Buijs |
| 2014/0243473 | A1 | 8/2014 | Siebecke et al. |
| 2014/0249330 | A1 | 9/2014 | Siebecke et al. |
| 2015/0314969 | A1 | 11/2015 | Siebecke et al. |
| 2016/0001254 | A1 | 1/2016 | Siebecke et al. |

FOREIGN PATENT DOCUMENTS

| | | |
|---|---|---|
| CN | 1437627 A | 8/2003 |
| DE | 195 06 407 A1 | 8/1996 |
| EP | 1 148 077 A1 | 10/2001 |
| EP | 1 194 473 A1 | 4/2002 |
| JP | S49-006198 B1 | 2/1974 |
| JP | S53-000294 A | 1/1978 |
| JP | 2001-514281 A | 9/2001 |
| WO | 99/10408 A1 | 3/1999 |
| WO | WO 2000-075216 A1 | 12/2000 |

OTHER PUBLICATIONS

European Patent Office, International Search Report in International Application No. PCT/EP2014/051005 (Apr. 3, 2014).

State Intellectual Property Office of the People's Republic of China, First Office Action in Chinese Patent Application No. 201480007863.X dated Jun. 20, 2016.

Korean Intellectual Property Office, Notification of Reason for Refusal in Korean Patent Application No. 10-2015-7020799 (Jan. 22, 2018).

Japan Patent Office, Decision of Refusal in Japanese Patent Application No. 2015-556435 (Jan. 4, 2018).

* cited by examiner

REACTOR WITH VERTICAL CONDENSATION TUBE AND METHOD FOR THE POLYMERISATION OF POLYAMIDES IN SUCH A REACTOR

CROSS-REFERENCE TO RELATED APPLICATIONS

This patent application is the U.S. national phase of International Application No. PCT/EP2014/051005, filed on Jan. 20, 2014, which claims the benefit of European Patent Application No. 13154509.7, filed Feb. 8, 2013, the disclosures of which are incorporated herein by reference in their entireties for all purposes.

The invention relates to a reactor in the form of a VK pipe (VK: for the German "vereinfacht kontinuierlich", i.e. simplified continuous), for the polymerisation of polyamides, the reactor being subdivided into an upper and lower reactor region, which are controllable independently of each other. Likewise, the invention relates to a method for the production of polyamides in which such a reactor is used.

In the production of highly viscous PA6 (with and without use of copolymers), two modes of operation are available to the producer at present. On the one hand, the production of high viscosity in the melt of the polymerisation reactors, on the other hand, by the use of solid-state postcondensation (SSP) in a subsequent treatment step.

Since, as a result of the SSP, also undesired by-products (monomers) which disrupt further processing are formed, increasing the viscosity in the polymerisation step is always preferable.

Increasing the viscosity in the polymerisation step requires, because of the chemical equilibrium, the separation of water from the polymer melt. This is effected most effectively by additional reactor steps which are implemented in succession in pressure steps (with decreasing pressure). The water proportion is reduced thereby from step to step and hence makes possible the further viscosity increase. However, due to the additional number of reactors and associated equipment parts, increased complexity in the overall plant is thereby produced. As a result of the greater spatial requirement and more complex assembly, additional costs which are not acceptable for the producer result. In practice, the installation of at most two series-connected polymerisation reactors (prepolymerisation reactor and VK pipe) has proved its worth. Also a preceding mixing and heating step, in which the raw materials are mixed and heated, can possibly be used. This container should not however be regarded as a polymerisation reactor.

In order to achieve the maximum polymer viscosity, generally the second polymerisation reactor (VK tube) is operated at a low pressure down to 400 mbar. Pollution problems and operational instability at pressures below 600 mbar absolute, which limit the quality of the product, increase thereby. A relative viscosity (RV) in the case of non-stabilised polymer of up to RV=3.2 can be achieved herewith. In the case of stabilised polymer, this value is significantly below that.

The state of the art in the production of PA6 is the polymerisation in a 2-step reactor cascade in which the first reactor (prepolymerisation) is operated at high pressure in order to increase the ring-opening reaction and the reaction conversion. The second reactor is operated at ambient pressure or vacuum in order to achieve the required viscosity. The state of the art is implementation of the prepolymerisation without melt cooling and the design of the VK tube without a further degassing-/dewatering step with a melt cooler (Franz Fourné, Synthetic Fibres, p. 54, chapter 2.2.3.9 and also EP 1194473A1).

Starting herefrom, it was the object of the present invention to provide a polymerisation reactor with which a highest possible viscosity of the polymer melt is achieved without requiring to apply too high a vacuum.

This object is achieved by the reactor having the features of claim 1 and the method having the feature of claim 9. The further dependent claims reveal advantageous developments.

According to the invention, a reactor, in particular in the form of a VK tube, is provided for the polymerisation of polyamides with an upper and a lower reactor region.

The upper reactor region thereby has an inflow region for the addition of the prepolymer melt, a heating unit, a first flow tube part, a heated discharge cone and also, over the entire height of the upper reactor region, a wall heating unit.

The lower reactor region has an inflow region for the addition of the melt from the upper reactor region, a degassing possibility for separating process vapour, a static cooling unit, a second flow tube part, a heated discharge cone and a discharge tube connected thereto and also, over the entire height of the lower reactor region, a wall heating unit.

The two reactor regions are thereby connected to each other via a pipe.

Preferably, the heating unit is a static heating unit, in particular a tube bundle, an internally heated overflow body, a plate heat exchanger or a heating coil. However, it is likewise possible to use a dynamic heating unit, in particular a Roberts evaporator or a recirculation heater.

The static cooling unit is preferably a tube bundle, an internally heated overflow body, a plate heat exchanger or a heating coil.

Between the discharge cone of the upper reactor region and the inflow region of the lower reactor region, preferably a metering pump or a control valve for the transport of the polymer is integrated.

A further preferred variant provides that an agitator is disposed above the heating unit.

The VK tube according to the invention can be coupled preferably to a prepolymerisation reactor for the prepolymerisation of polyamides. This prepolymerisation reactor has an inflow region for the addition of the educts, a heating unit, a static or a dynamic heating unit being able to be used, a first flow tube part which has a separate wall heating unit, a second flow tube part which likewise has a separate wall heating unit, and also an outlet pipe for the prepolymer.

In the outlet pipe, preferably a discharge pump can be integrated for the transport of the prepolymer. Likewise, it is preferred if the outlet tube has a wall heating unit, in particular a heating jacket.

The prepolymerisation reactor has, between the first flow tube part and the second flow tube part, a cooling unit.

Preferably, the cooling unit and the separate wall heating units and the heating of the outlet pipe are coupled thermally via a single heat-transfer medium circulation.

The wall heating units of the reactor, independently of each other, can be double jackets and/or half-pipe heating coils.

The reactor according to the invention makes possible the production of a polyamide melt with an exceptionally high relative viscosity of 2.4 to 4.5 without a solid-state postcondensation requiring to be connected subsequently. This is made possible by the preceding prepolymerisation step. Hence, no additional spatial requirement for a further reactor step arises. By means of the combination of two reactor steps in one reactor, the VK tube, the operation takes place with exceptional energy efficiency since the heat losses of the upper reactor step via its discharge cone are used for heating the lower part and hence are not lost.

For equalisation of the flow, the flow tube parts can preferably have, at least partially, flow rectifiers.

According to the invention, a method for the polymerisation of polyamides in a reactor in the form of a vertical condensation tube (VK pipe) with an upper and a lower reactor region is likewise provided, in which a) the prepolymer melt is metered into an inflow region of the upper reactor region, b) the temperature of the melt is set to 240 to 270° C., in particular 250 to 265° C., by means of a heating unit, c) the melt is conducted via a first flow tube part, which is coupled to a separate wall heating unit in order to avoid a heat loss, to a cooling unit with which the temperature of the melt is set to 225 to 260° C., in particular 230 to 240° C. and d) the melt is transported via a second flow tube part, which is coupled to a separate wall heating unit in order to avoid a heat loss, to an outlet pipe.

Preferably, the cooling unit and the separate wall heating units are thereby coupled thermally via a single heat-transfer medium circulation.

In a mixing container connected before the inflow region, the educts can be premixed in advance. Included in the educts here are the monomers, water and further additives.

In the flow pipe parts, a plug flow of the melt can be made possible preferably by means of flow rectifiers.

The melt can be transported both through the outlet pipe by means of a discharge pump or by means of pressure in the reactor.

Preferably, the prepolymer is then supplied via the outlet pipe to a further polymerisation reactor, in particular a VK tube.

According to the invention, a polyamide with a relative viscosity of 2.4 to 4.5, preferably 3.0 to 3.6, respectively measured in a solution of 1 g of polyamide in 96 per cent sulphuric acid is likewise provided, which polyamide was produced according to the previously described method.

The subject according to the invention is intended to be explained in more detail with reference to the subsequent Figure without wishing to restrict said subject to the specific embodiment shown here.

Figure 1:
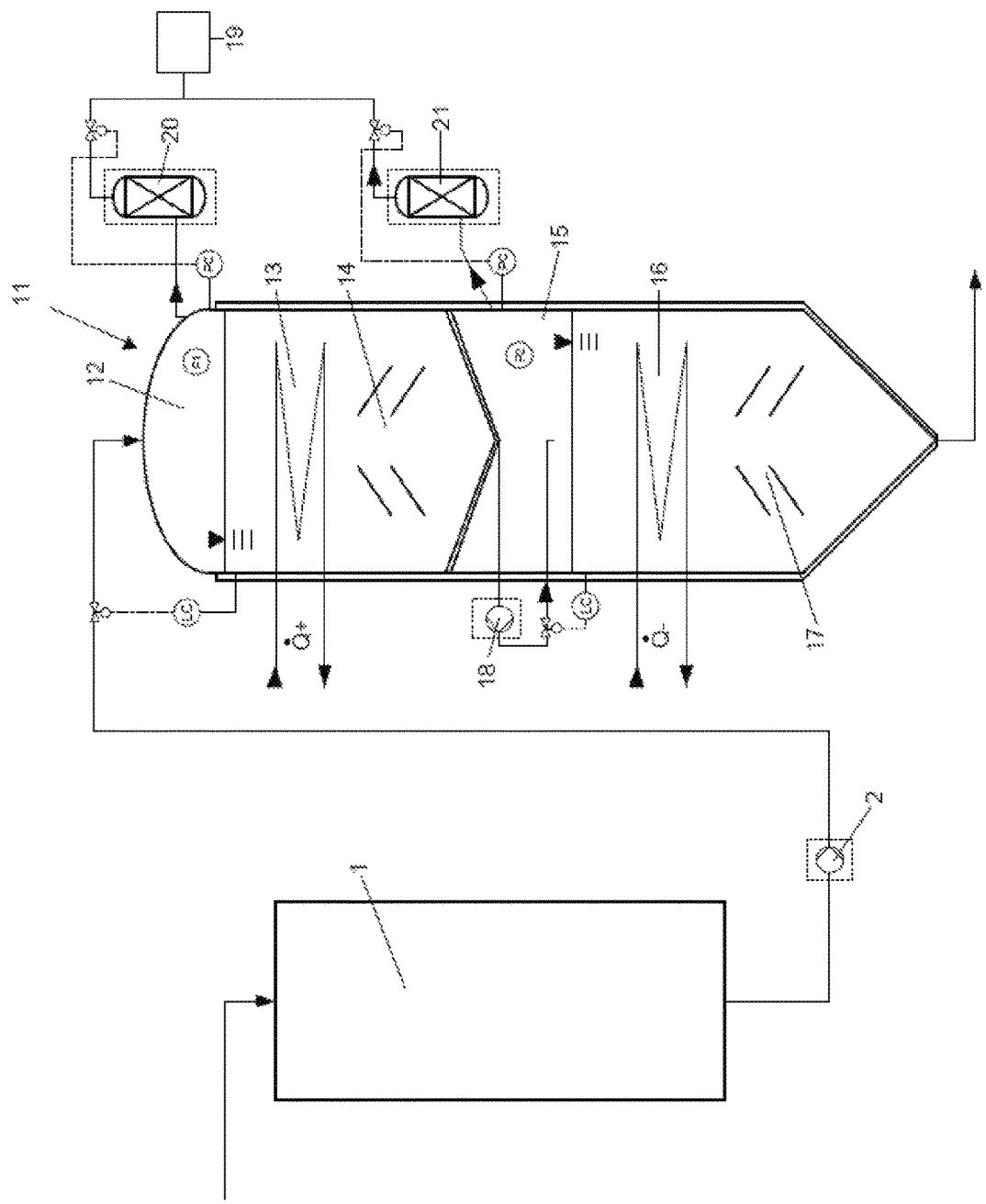
FIG. 1 shows the reactor according to the invention in a schematic illustration.

In FIG. 1, a flow pipe reactor VK tube (11) according to the invention is illustrated, consisting of two individual reactor chambers, which are controllable independently of each other, with gas chamber (12, 13, 14 and 15, 16, 17). In both reactor portions, the inflow is configured as a function of the automatic level measurement, the temperature can be set by an automatic heat exchanger part and the operating pressure is maintained constant by a pressure control with control valve and optional waste gas wash. In order to be able to set a constant vacuum in the case of both reactor steps, a vacuum unit is used for the degassing (optionally also two separate vacuum units—one for each reactor part) which provides a basic vacuum which is lower than the operating pressure in both reactor parts. The pressure setting is effected via control valves.

The upper reactor part is equipped with an active wall heating unit (double jacket or half-pipe heating coil) over the entire height of the frame. Optionally, an agitator can be installed in the fluid volume above the polymer heater (13).

The melt is supplied in such a way that a large evaporation surface is available. This can take place on the reactor walls, on internally heated heating bodies in the melt chamber or by a further thin-film distribution. A fluid level is produced by collected melt which causes per se homogenisation of the melt.

Below the fluid level, a polymer heater (13) is situated, which can be designed either statically (tube bundle, internally heated overflow body, plate heat exchanger, heating coil or the like) or as a dynamic heater (Roberts evaporator, recirculation heater or the like).

Below the heater, a flow tube part (14) is situated, which is equipped with flow rectifiers in order to set a plug flow of the melt and hence a homogeneous dwell time distribution. Via a heated discharge cone, the melt is conducted out of the reactor and, via an optional metering pump (18) and/or a control valve, is conducted into the lower reactor part.

The lower reactor part is equipped entirely with a separate wall heating unit (double jacket or half-pipe heating coil). The melt is supplied in such a way that a large evaporation surface is available. This can take place on the reactor walls, on internally heated heating bodies in the melt chamber or by means of further, thin-film distribution. A fluid level is produced by the collected melt which causes per se homogenisation of the melt.

Below the fluid level, a static polymer cooler (16) is situated (configured as tube bundle, internally heated overflow body, plate heat exchanger, heating coil or the like).

Below the heater, a flow tube part (17) is situated, which is equipped with flow rectifiers in order to set a plug flow of the melt and hence a homogeneous dwell time distribution. Via a heated discharge cone, the melt is conducted out of the reactor and conducted to a subsequent discharge pump.

The raw materials (caprolactam, water, additives, possibly extracts from this and/or other polymerisation plants) are mixed in the first reactor step (1), heated and processed to form a PA6 prepolymer.

This prepolymer is metered continuously into the VK tube (11), The metering quantity is controlled automatically hereby as a function of the level in the VK tube top. This can take place by means of a control valve or optionally by means of a suitable prepolymer pump (7). The pressure in the VK tube top, in the gas chamber of the reactor top (12), is maintained automatically at an operating pressure of 600 to 1,050 mbar absolute, preferably 850 to 950 mbar absolute. Water and caprolactam vapours which are produced by further heating are withdrawn and conducted through a pressure control valve to a vacuum unit (19). Optionally, the vapours can be precondensed and washed in a washing column (20). Because of the lower pressure and increased temperature, compared with the prepolymerisation (1), water is removed from the prepolymer melt.

The prepolymer is brought to polymerisation temperature at the top of the VK tube. This takes place by means of a melt heater (13) incorporated in the VK pipe. The melt heater can be configured as a static heater (tube bundle, internally heated overflow body, plate heat exchange, heating coil or the like) or as a dynamic heater (Roberts evaporator, recirculation heater or the like). The heated polymer is conducted through the upper flow pipe reactor part (14) of the VK pipe (11) in which the dwell time required for the reaction is made available. The flow through the flow part is effected in a plug flow which is ensured by reactor baffles. At the lower end of the flow tube reactor part, the melt is collected via an internally situated cone and conducted into a pipe.

From here, the polymer melt is conducted into the lower part of the VK tube (11) with level control. For this purpose, optionally a pump (18) can be used or merely the static head of the upper part of the reactor is used as driving force. The lower part of the VK tube is provided with a lower gas chamber (15) via which a lower operating pressure can be set in the lower reactor part than in the reactor top (12). The pressure in the lower part of the reactor is maintained automatically at an operating pressure of 550 to 900 mbar absolute, preferably 600 to 800 mbar absolute. Water and caprolactam vapours which are evaporated by the pressure reduction are withdrawn and conducted by a pressure control valve to a vacuum unit (19). Optionally, the vapours can be precondensed and washed in a washing column (21).

The expanded polymer melt is cooled via a static polymer cooler (16). The energy which is withdrawn from the melt can be used in other reaction steps or supplied to the environment as waste heat. After cooling, the melt is conducted into the lower flow tube part (17) situated thereunder, in which the dwell time required for the reaction is made available. The flow through the flow part is effected in a plug flow which is ensured by reactor baffles. The highly viscous polymer melt is withdrawn through the discharge cone and supplied to the subsequent granulation.

In the lower evaporation chamber (15), the water which was formed by the equilibrium reaction in the flow tube part (14) situated above can be withdrawn. As a result, a significantly lower water content can be formed in the polymer and hence a higher relative viscosity (RV) than in the case of simple expansion in the top part of the VK tube, even if a lower absolute pressure were reached there.

Figure 2:
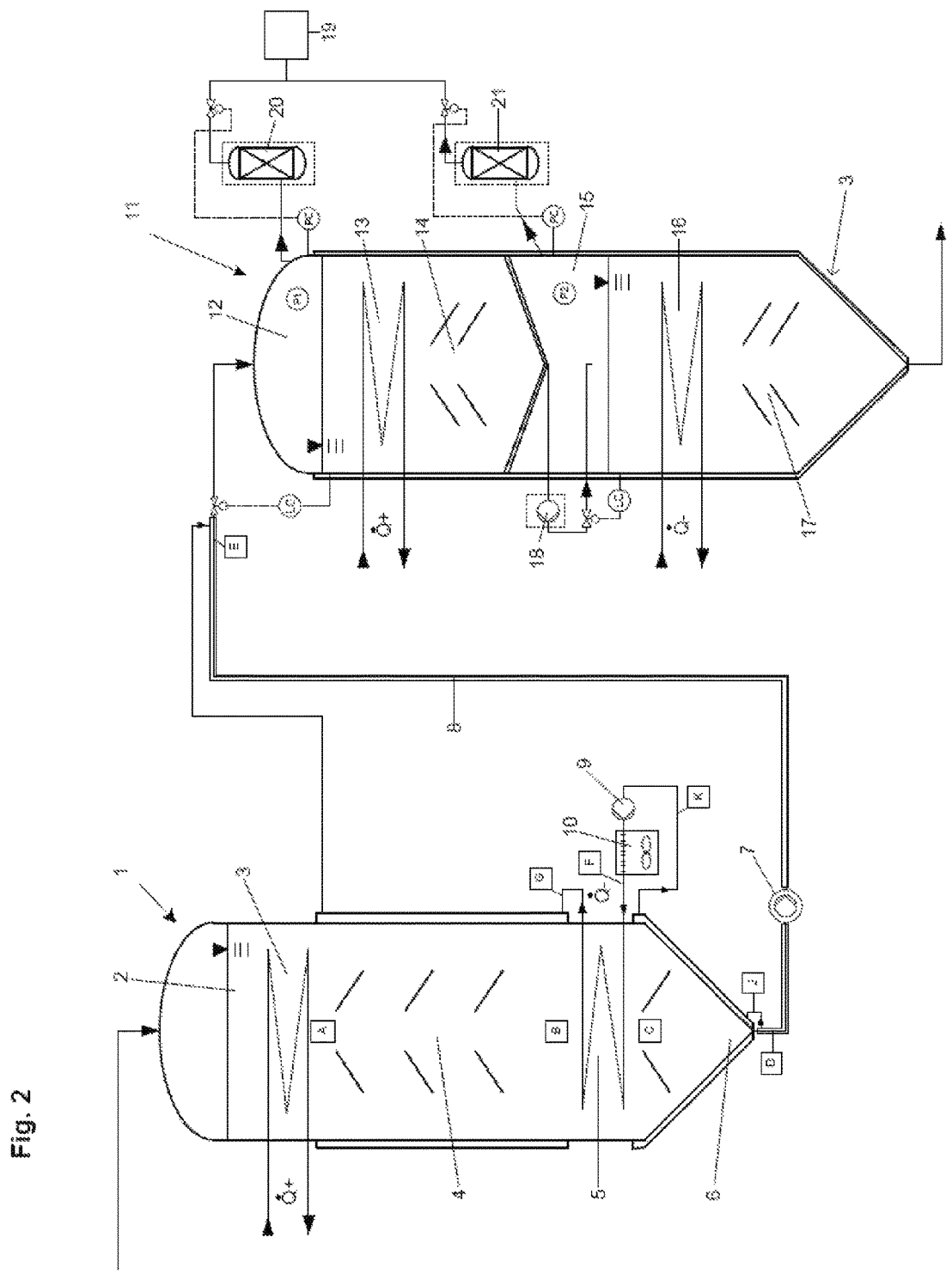
FIG. 2 shows coupling of a prepolymerisation reactor with a reactor according to the invention (VK tube) to form a two-step polymerisation plant according to the invention.

In FIG. 2, the two-step polymerisation plant according to the invention is illustrated.

The prepolymerisation reactor (1) consists of an inflow region (2) into which the raw material mixture of caprolactam, water, additives and optionally recycled extracts from an extraction step are metered. The possibility also exists that the raw material mixture was already mixed and heated in a preceding mixing container and the finished mixture is supplied to the prepolymerisation reactor. A fluid level is produced by the collected raw material mixture which causes homogenisation of the melt.

Below the fluid level, a heater (3) is situated, which can be designed either statically (tube bundle, internally heated overflow body, plate heat exchanger, heating coil or the like) or as a dynamic heater (Roberts evaporator, recirculation heater or the like). The temperature required for the polymerisation is set here automatically and continuously.

Below the heater, a flow tube part (4) is situated which is equipped with flow rectifiers in order to set a plug flow of the melt and hence a homogeneous dwell time distribution. This reactor part is equipped entirely with a separate wall heating unit (double jacket or half-pipe heating coil) which counteracts a heat loss as active insulation without affecting the melt temperature.

The prepolymer melt is thereafter guided through a static prepolymer cooler (5) in which the temperature is reduced to a temperature below the prepolymerisation temperature but above the melting point (225 to 260° C., preferably 230 to 240° C.).

Below the cooler, a further flow tube part (6) is situated, which is equipped with flow rectifiers in order to set a plug flow of the melt and hence a homogeneous dwell time distribution. This reactor part is equipped in turn with a separate wall heating unit (double jacket or half-pipe heating coil) which counteracts a heat loss as active insulation without affecting the melt temperature. Via a discharge cone, the melt is conducted out of the reactor and conducted to a subsequent discharge pump (7). Optionally, the increased pressure in the prepolymerisation reactor can also be used for the further melt transport. The melt is conveyed via a heated prepolymer pipe (8) to the top of the subsequent VK tube (11), as was described in FIG. 1. Because of the intensive contact and the large tube surface, the temperature of the melt is hereby raised again.

The heat which is withdrawn from the polymer melt in the prepolymer cooler (5) is used in order to heat again the prepolymer melt which leaves the prepolymerisation reactor. Due to the limited dwell time in the prepolymerisation pipe, the chemical equilibrium in the prepolymer melt remains unchanged and the increased water deposition in the subsequent VK tube (11) continues to be present.

Cooling of the prepolymer melt is ensured by a constant heat-transfer oil flow (HTM). Cooled HTM is conducted through the melt cooler (5) in counterflow to the melt. The heat-transfer oil thereby adopts the inflow temperature of the melt into the cooler. At this temperature level, the HTM can be used in order to heat the heating jacket of the flow pipe part (4) of the prepolymerisation reactor (1). Thereafter, the HTM is guided into the jacket of the prepolymerisation pipe in counterflow to the prepolymer melt. By means of the counterflow guidance, the prepolymer melt is heated and the HTM is cooled almost to outlet temperature of the prepolymerisation reactor. Thereafter, the HTM is supplied through the jacket of the lower reactor part (6) so that it leaves the jacket of the reactor at a temperature close to the melt temperature in the outflow of the melt cooler. Via a pump (9) and an air cooler (10), it is conducted, even further cooled, again into the melt cooler (5).

In Table 1, temperature ranges according to the invention in the reaction course of a PA6 production plant with prepolymer cooling are indicated, the flow numbers relating to FIG. 2.

TABLE 1

| Flow number | Temperature |
| --- | --- |
| A | 240 . . . 270° C., preferably 250 . . . 265° C. |
| B | 245 . . . 275° C., preferably 255 . . . 270° C. |
| C | 220 . . . 255° C., preferably 230 . . . 240° C. |
| D | 220 . . . 255° C., preferably 230 . . . 240° C. |
| E | 240 . . . 275° C., preferably 253 . . . 268° C. |
| F | 218 . . . 253° C., preferably 228 . . . 238° C. |
| G | 243 . . . 273° C., preferably 253 . . . 268° C. |
| H | 243 . . . 273° C., preferably 253 . . . 268° C. |
| J | 222 . . . 257° C., preferably 232 . . . 242° C. |
| K | 222 . . . 257° C., preferably 232 . . . 242° C. |

The dwell time in the prepolymerisation reactor is thereby 3.5 hours. The top temperature in the prepolymerisation reactor is 250° C., whilst the outlet temperature is 265° C. The prepolymerisation reactor is operated at an operating pressure of 3.0 bar.

The dwell time in the VK tube is 9 hours. The top temperature in the VK tube is hereby 275° C. and the output temperature 240° C. The VK tube is operated at an operating pressure of 1.0 bar.

If only one degassing step is used in the VK tube, the relative viscosity of the polymer is subsequently 2.69. Determination of the relative viscosity is effected on the extracted polymer, measured in 96 percent sulphuric acid. The average polymerisation degree is 158.

If the VK tube with two degassing steps is used, the degassing is effected in the second degassing step at 275° C. and 0.6 bar. A polymer with a relative viscosity of 3.19 hereby results (measured on the extracted polymer, measured in 96 per cent sulphuric acid). The average polymerisation degree here is 200.

The invention claimed is:

1. A reactor in the form of a simplified continuous (VK) tube for the polymerisation of polyamides with an upper and a lower reactor region,
the upper reactor region having
an inflow region for the addition of a prepolymer melt,
a heating unit,
a first flow tube part,
a heated discharge cone, and
over the entire height of the upper reactor region, an upper reactor region wall heater, and
the lower reactor region having
an inflow region for the addition of the melt from the upper reactor region and the separation of process vapour,
a static cooling unit,
a second flow tube part,
a heated discharge cone and a discharge pipe connected thereto, and
over the entire height of the lower reactor region, a lower reactor region wall heater, and
the upper and the lower reactor regions being connected via a tube, wherein, between the discharge cone of the upper reactor region and the inflow region of the lower reactor region, a metering pump or a control valve for the transport of the prepolymer is integrated.

2. The reactor according to claim 1,
wherein the heating unit is a static heating unit, or a dynamic heating unit, and/or the static cooling unit is a tube bundle, an internally heated overflow body, a plate heat exchanger or a heating coil.

3. The reactor according to claim 1, wherein an agitator is disposed above the heating unit.

4. The reactor according to claim 1, wherein the VK tube is connected to a prepolymerisation reactor for the prepolymerisation of polyamides, the prepolymerisation reactor having
an inflow region for the addition of educts,
a heating unit,
a first flow tube part which has a first wall heater,
a second flow tube part which has a second wall heater and
an outlet pipe for the prepolymer,
and a cooling unit disposed between the first flow tube part and the second flow tube part.

5. The reactor according to claim 4, wherein the cooling unit and the second wall heater of the prepolymerisation reactor are coupled thermally via a single heat-transfer medium circulation.

6. The reactor according to claim 1, wherein the lower reactor region wall heater and the upper reactor region wall heater, independently of each other, are double jackets and/or half-pipe heating coils.

7. The reactor according to claim 1, wherein the flow tube parts have, at least partially, flow rectifiers.

8. A method for the polymerisation of polyamides in a reactor according to claim 1 in the form of a vertical condensation tube (VK tube) with an upper and a lower reactor region, in which
a) a prepolymer melt is metered into the inflow region of the upper reactor region,
b) the temperature of the melt is set to 240 to 280° C. by means of the heating unit of the upper reactor region,
c) the melt is conducted via the first flow tube part, which is coupled to the upper reactor region wall heater in order to avoid a heat loss, to the static cooling unit with which the temperature of the melt is set to 225 to 260° C. and
d) the melt is transported via the second flow tube part, which is coupled to the lower reactor region wall heater in order to avoid a heat loss, to an outlet pipe.

9. The method according to claim 8, wherein the prepolymer melt is supplied from a prepolymerisation reactor wherein
a) educts are metered into an inflow region of the prepolymerisation reactor,
b) the metered educts are heated to form a prepolymer melt and the temperature of the prepolymer melt is set to 240 to 270° C. by means of a heating unit in an upper region of the prepolymerisation reactor,
c) the resulting prepolymer melt is conducted via a first flow tube part, which is coupled to a separate wall heating unit in order to avoid a heat loss, to a cooling unit with which the temperature of the prepolymer melt is set to 220 to 255° C., and
d) the resulting prepolymer melt is transported via a second flow tube part, which is coupled to a separate wall heating unit in order to avoid a heat loss, to an outlet tube which is coupled to the VK tube.

10. The method according to claim 8, wherein a plug flow of the melt is made possible in the first and the second flow tube parts by means of flow rectifiers.

11. The method according to claim 9, wherein the prepolymer melt is transported through the outlet tube, by means of a discharge pump or by means of pressure in the reactor, to the VK tube.

12. The reactor according to claim 2, wherein the static heating unit is a tube bundle, an internally heated overflow body, a plate heat exchanger or a heating coil, the dynamic heating unit is a Robert evaporator or a recirculation heater, and/or the static cooling unit is a tube bundle, an internally heated overflow body, a plate heat exchanger or a heating coil.

13. The reactor according to claim 2, wherein an agitator is disposed above the heating unit.

14. The reactor according to claim 2, wherein the VK tube is connected to a prepolymerisation reactor for the prepolymerisation of polyamides, the prepolymerisation reactor having
an inflow region for the addition of educts,
a heating unit,
a first flow tube part which has a first wall heater,
a second flow tube part which has a second wall heater, and
an outlet pipe for the prepolymer, and
the prepolymerisation reactor having, between the first flow tube part and the second flow tube part, a cooling unit.

15. The reactor according to claim 14, wherein the cooling unit and the second wall heater are coupled thermally via a single heat-transfer medium circulation.

16. The reactor according to claim 2, wherein the lower reactor region wall heater and the upper reactor region wall heater, independently of each other, are double jackets and/or half-pipe heating coils.

17. The reactor according to claim 2, wherein the flow tube parts have, at least partially, flow rectifiers.

* * * * *